June 11, 1963
A. B. PEDERSEN
3,093,109
DEVICE FOR CHECKING THE OIL FEED FROM
A PUMP TO A LUBRICATION POINT
Filed Jan. 9, 1958
FIG.1.   FIG.2.
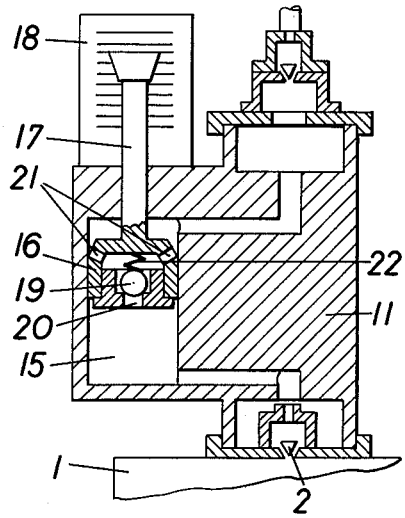
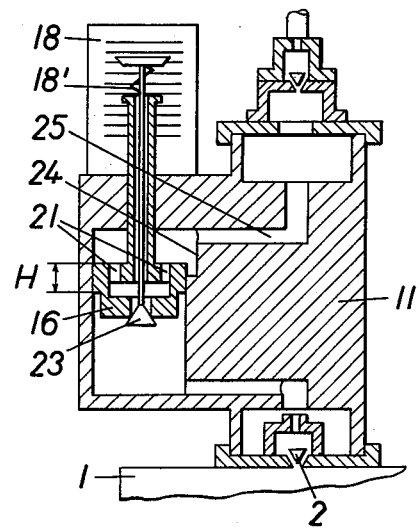
FIG.3.
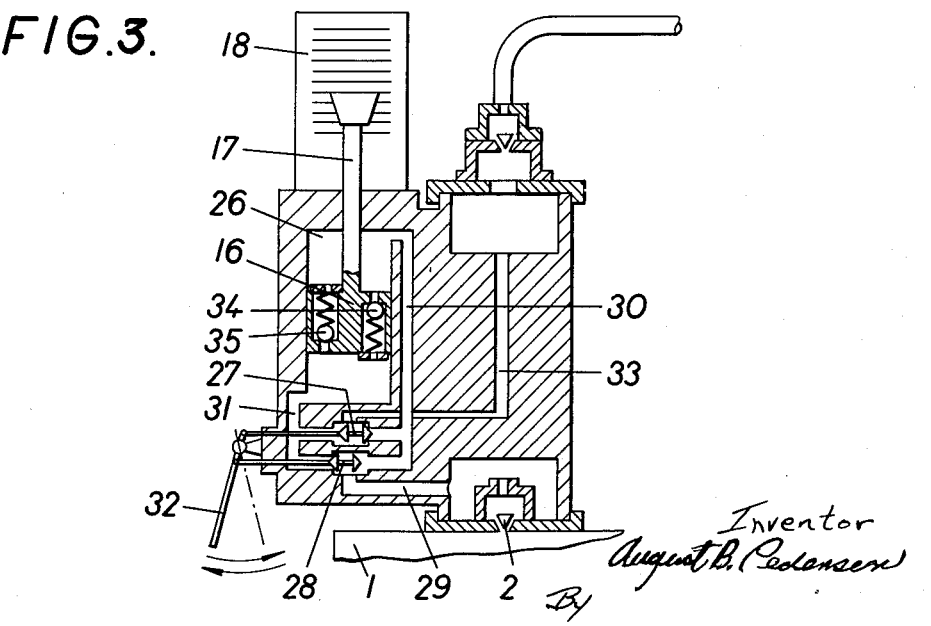
Inventor
August B. Pedersen
By
Watson, Cole, Grindle & Watson
Attorneys

United States Patent Office 3,093,109
Patented June 11, 1963

---

3,093,109
DEVICE FOR CHECKING THE OIL FEED FROM A PUMP TO A LUBRICATION POINT
August Bartold Pedersen, Seljeholtet 3, Blommenholm, Norway
Filed Jan. 9, 1958, Ser. No. 707,974
Claims priority, application Norway Jan. 9, 1957
2 Claims. (Cl. 116—117)

The present invention relates to a device for checking the oil feed from a pump to a place where lubrication is to be effected.

It is an object of the present invention to provide a device which enables a definite indication of the oil feed, and according to the invention this is achieved by moving a member which is freely movable in a chamber by displacement action of the oil introduced into the chamber, and so that the distance of travel in a certain period of time indicates the displaced quantity.

The chamber referred to is inserted in the oil circuit, and the movable member is provided with an indicator indicating the movements of the member. Thus, by means of such a device, the lubricating oil quantity may be checked without the oil being visible at all.

The movable member may consist of a rotor which continuously indicates the oil quantity, or it may consist of a plunger which only effects such an indication when required. The plunger will, however, always indicate an oil flow through the chamber by adopting an end position under the action of the oil pressure.

The invention is illustrated on the accompanying drawings, wherein

FIGURE 1 is a sectional view of a device made in accordance with the invention, taken along the axes of the cylinder and of the inlet and outlet openings of the same;

FIGURE 2 is a sectional view, similar to that of FIGURE 1, of a second embodiment of the device of the invention; and FIGURE 3 is a sectional view, similar to that of FIGURE 1, of a further embodiment of the device of the invention.

In all figures, only the device proper is shown, while the tank on which the device is to be mounted is merely indicated, as the same forms no part of the invention and is of no significance to an understanding of the same.

FIGURE 1 illustrates an embodiment wherein a reciprocative plunger 16 is provided in a cylinder 15 formed in a body 11 which is mounted on an oil supply tank 1 having an outlet 2. Oil is forced through the outlet 2 and into the cylinder 15 by any suitable means (not shown). The plunger 16 is provided with a rod 17 which extends through the top wall of the cylinder and, at the free end, is moved along a scale 18. The plunger is provided with flow openings 20, 21 of which the opening 20 is closed by a ball valve 19 which is under the action of a spring 22, the bias of which is so chosen that the valve is kept closed when the plunger is moved upwardly by the oil pressure.

In this case, the indication is effected by initially moving the plunger to the bottom of the cylinder, whereby the oil in the cylinder is freely passing through the openings 20, 21 from one side of the plunger to the other. When the plunger rod is released, the plunger commences to move upwardly and the distance covered is, at any time, indicative of the oil volume which forces the plunger upwardly, and may be observed on the scale 18.

When the plunger has arrived in the top position, the oil commences to flow through the opening 20 and thence to the lubrication point. Thus the plunger is kept in engagement with the top wall of the cylinder, thereby indicating that the pump is delivering lubricating oil. If the oil delivery is interrupted, the plunger will, within a short time, start a downward movement, the clearance between the cylinder wall and the plunger allowing oil from the under side of the plunger to pass to the top side. Consequently, any interruption of the oil supply is easily recognizable.

In the embodiment illustrated in FIGURE 2 the plunger operates in the same manner as regards the indication of the oil quantity, but when the plunger is in its top position, the oil passes along the sides of the plunger instead of through an opening in the same. The lower part of the plunger is made with a slightly decreased diameter as compared with the top part which has a length indicated by H, and this top part cooperates with a recess 24 in the cylinder wall, the length of which is greater than the length H. Consequently, when the plunger is raised so far that the lower edge of the top part of the plunger has passed the lower edge of the recess 24, the oil will flow through the opening so provided and thence through the passage 25.

For the purpose of carrying the plunger downwardly to the bottom position when indicating of the oil quantity is to be effected, the plunger is provided with a valve 23 which may be opened downwardly by means of a valve rod extending through the plunger rod and normally biased upwardly by a spring 18'.

In the embodiment illustrated in FIGURE 3, the plunger 16 is arranged in the cylinder 26 for indicating of the oil quantity when moving in either direction, the oil flow being adapted to be directed selectively to the bottom and top sides. For this purpose the cylinder is provided with passages 30 and 31, conveying the oil to the upper and lower sides, respectively, of the plunger. These passages open out in a valve casing wherein double valves 27, 28 direct the oil, received through the passage 29, in either direction in dependence upon the position of the setting handle 32. The outlet passage 33 communicates with the passage 30 and, through the valve casing of the double valves, also with the passage 31.

When the plunger is in either of its end positions, the oil passes through openings provided in the plunger, as in the embodiment shown in FIGURE 1, and the plunger is, for this purpose, provided with two valves adapted to open in mutually opposite directions.

I claim:

1. A device for indicating the feed from a source of lubricating liquid to a point of delivery, comprising a cylinder provided with inlet and outlet openings adjacent its opposite axial ends, a plunger disposed for free axial movement within said cylinder, a plunger rod fixed to the plunger for movement therewith, said rod extending axially from the plunger and slidably disposed through one axial end of the cylinder with an end portion of the rod projecting externally of the cylinder to provide visible indication of its movement with the plunger, said plunger being formed with a passage opening therethrough, a valve carried by said plunger for axial movement in a direction to control said passage, resilient means yieldably urging said valve in an axial direction to close said passage whereby to cause movement of the plunger with the liquid within the cylinder, said externally extending portion of said rod providing means for manually moving said plunger independently of the fluid flow.

2. A device as defined in claim 1 in which said plunger rod is hollow, and including a valve rod fixed to said valve and slidably disposed through said hollow plunger rod.

References Cited in the file of this patent

UNITED STATES PATENTS

| | | |
|---|---|---|
| 194,737 | Small | Aug. 28, 1877 |
| 1,910,752 | Coles | May 23, 1933 |
| 2,263,840 | Franck | Nov. 25, 1941 |
| 2,520,869 | Windson | Aug. 29, 1950 |
| 2,638,582 | Urso et al. | May 12, 1953 |